United States Patent [19]

Kitayama et al.

[11] Patent Number: 4,787,707

[45] Date of Patent: Nov. 29, 1988

[54] COMPOSITE OVERHEAD TRANSMISSION CABLE

[75] Inventors: Yoshinobu Kitayama; Yasunori Saito, both of Kanagawa, Japan

[73] Assignee: Sumitomo Electric Industries, Ltd., Osaka, Japan

[21] Appl. No.: 99,695

[22] Filed: Sep. 18, 1987

Related U.S. Application Data

[63] Continuation of Ser. No. 722,472, Apr. 12, 1985, abandoned.

[30] Foreign Application Priority Data

Apr. 16, 1984 [JP] Japan .................................. 59-75018

[51] Int. Cl.$^4$ .............................................. G02B 6/44
[52] U.S. Cl. ............................. 350/96.23; 350/96.30; 350/96.34
[58] Field of Search ............... 350/96.23, 96.29, 96.30, 350/96.31, 96.32, 96.34

[56] References Cited

U.S. PATENT DOCUMENTS

| | | | |
|---|---|---|---|
| 4,028,080 | 6/1977 | Di Vita et al. | 350/96.30 X |
| 4,431,264 | 2/1984 | Clarke | 350/96.34 |
| 4,441,788 | 4/1984 | Guerder et al. | 350/96.34 |
| 4,491,387 | 1/1985 | Dey et al. | 350/96.23 |
| 4,504,113 | 3/1985 | Baak | 350/96.33 |
| 4,514,058 | 4/1985 | Walton | 350/96.23 |
| 4,664,474 | 5/1987 | Tanaka et al. | 350/96.34 |
| 4,671,610 | 6/1987 | Kitayama et al. | 350/96.23 |
| 4,691,990 | 9/1987 | Cohen et al. | 350/96.33 |
| 4,715,678 | 12/1987 | Johnson et al. | 350/96.23 |

FOREIGN PATENT DOCUMENTS

| | | | |
|---|---|---|---|
| 2116746 | 9/1983 | United Kingdom | 350/96.23 |
| 2144878 | 3/1985 | United Kingdom | 350/96.23 |

*Primary Examiner*—John D. Lee
*Attorney, Agent, or Firm*—Sughrue, Mion, Zinn, Macpeak and Seas

[57] ABSTRACT

A composite optical fiber overhead cable having improved long-term strength and loss characteristics. A plurality of optical fibers are accommodated in spiral grooves of the spacer around which conductor strands are wound. The fibers contain flourine in at least one of the core and cladding layers thereof. Each of the optical fibers is provided with a surrounding hermetic coat, and a heat-resistant elastic material is filled between each optical fiber and the bottom of its respective groove to restrain movement of the optical fibers in the grooves in the longitudinal direction.

8 Claims, 2 Drawing Sheets

COMPOSITE OVERHEAD TRANSMISSION CABLE

This is a continuation of application Ser. No. 722,472, filed Apr. 12, 1985, abandoned.

BACKGROUND OF THE INVENTION

The present invention relates to a composite overhead stranded conductor obtained by providing an optical fiber cable in an overhead power line formed by stranding a plurality of conductors, or in an overhead ground wire which extends parallel to such an overhead power line.

System protection, control and surveillance of overhead power lines are important for their proper performance. In order to meet these requirements accurately and precisely, composite overhead stranded conductors having optical fibers accommodated in overhead power lines or overhead ground wires are used. The construction of a conventional composite overhead stranded conductor is illustrated in FIG. 1.

In FIG. 1, a spacer 1 is provided in the center of the composite overhead stranded conductors. Spiral grooves 2 are formed in the periphery of the spacer 1, and optical fibers 3 are loosely fitted in the grooves 2. The spacer 1 is accommodated in an aluminum protective tube 4 to form an optical unit. Aluminum-clad steel wires 5 are wound around the optical unit.

Such composite overhead stranded conductors are used in a more hostile environment than that encountered by ordinary optical fiber cables for communications purposes and are required to have better stability in transmission characteristics under such unfavorable conditions.

After installation, the composite overhead stranded conductor is stretched under the effect of its own weight or other tensile stresses caused by temperature elevation due to dielectric currents or abnormal short-circuit currents. As an illustration of the extreme nature of temperature variations, a cable which is normally at about 50° C. is heated up to as high as about 400° C. if a short-circuit current occurs.

It is well known that an optical fiber exposed to high temperatures suffers not only microbending loss due to the shrinkage of the jacket around the fiber, but also absorption loss due to the presence of OH groups. One principal cause for the absorption loss is hydrogen gas which is released from the jacket and diffuses into the fiber core so as to react in defects in the core glass to form OH groups. With the composite overhead stranded conductor, hydrogen gas released from the jacket around the fiber under elevated temperatures is confined within the protective tube. This increases the amount of hydrogen gas that diffuses into the fiber core, thereby causing a greater absorption loss due to OH groups.

These adverse effects of hydrogen gas can be avoided by using an optical fiber whose core or cladding is doped with fluorine. As already mentioned, the primary cause of the increased transmission loss due to hydrogen gas is the absorption loss due to the OH groups formed by reaction with hydrogen gas. Fluorine is capable of preventing the increase in transmission loss by suppressing the formation of unwanted OH groups. However, the fluorine-doped optical fiber has other problems: first, its mechanical strength is reduced, and secondly, microbending is highly likely to occur under varying temperature conditions. Therefore, from a reliability viewpoint, such fluorine-doped optical fiber has only limited use in composite overhead stranded conductors which are subjected to greater temperature variations than ordinary cables and which are typically used in an environment involving relatively large mechanical disturbances such as vibration.

SUMMARY OF THE INVENTION

Accordingly, a primary object of the present invention is to provide a composite overhead stranded conductor that is free from the above-described defects of the conventional product.

The above and other objects are achieved in accordance with the invention by a composite overhead stranded conductor comprising aluminum clad-steel wires wound around an optical fiber protective tube which has a plurality of optical fibers and/or optical bundles accommodated therein, characterized in that a spacer having spiral grooves in its periphery is accommodated in the protective tube, and the fibers accommodated therein contain fluorine in their core or cladding. In a preferred embodiment, each of the optical fibers is provided with a surrounding hermetic coat. In still another preferred embodiment, a heat-resistant elastic material such as a silicone resin or silicone rubber is filled between each optical fiber and the bottom of each groove and/or filled between each optical bundle and the bottom of each groove so that the optical fibers and/or the optical bundles in the grooves are restrained in the longitudinal direction.

According to the present invention, optical fibers containing fluorine are accommodated in the grooves in the spacer, and by so doing, the disadvantages that result from a drop in the strength of fluorine-doped fibers are eliminated so as to ensure a high reliability, which in turn enables the fibers to withstand the hostile environment that prevails in the use of composite overhead stranded conductors. Furthermore, any possible increase in the transmission loss is minimized to achieve optimum transmission characteristics. Even if hydrogen gas released from the jackets around the fibers at elevated temperatures enters the optical fibers confined in the protective tube, the fluorine in the fibers inhibits the generation of OH groups, thereby minimizing the increase in the transmission loss. The mechanical strength of the optical fibers is ensured by the spacer in which they are accommodated.

Better results are obtained by providing a hermetic coat around each optical fiber. The hermetic coat is preferably formed of a metal, metal oxide, or nonmetallic inorganic material such as silicon nitride. Illustrative metals and metal oxides are elemental metals such as tin, aluminum, copper solder, indium and antimony, and their oxides. The hermetic coat prevents the entrance of hydrogen gas into the optical fibers, thereby ensuring more effective suppression of the generation of OH groups in the optical fibers.

Better results are also obtained by installing the optical fibers and/or optical bundles in the spacer with a heat-resistant elastic material such as silicone resin or silicone rubber filled between each optical fiber and the bottom of each groove in the spacer and/or between each optical bundle and the bottom of each groove in the spacer. By so doing, the optical fibers become integral with the spacer and are restrained from moving in the longitudinal direction. Any expansion or contraction of the spacer will uniformly affect the optical fibers without causing local strains, and this is effective in preventing the occurrence of localized microbending.

DESCRIPTION OF THE PREFERRED EMBODIMENTS

In addition to the advantage of minimizing the increase in transmission loss due to OH groups, fluorine-doped optical fibers are characterized by high resistance to radioactive rays and may be used in composite overhead stranded conductors at a nuclear power plant. Even if the optical fibers are accidentally exposed to radioactive emission, the resulting loss is reduced by the fluorine dopant.

Figure 2:
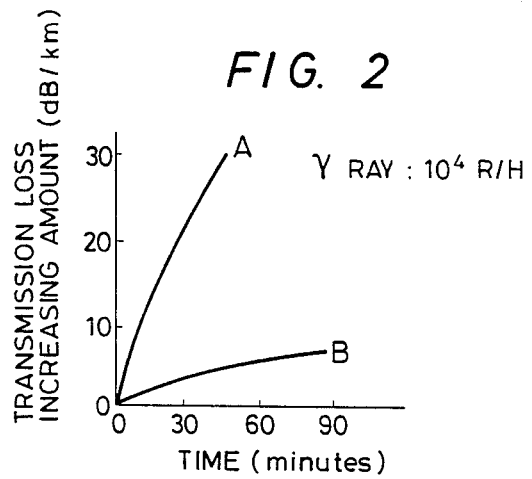
FIGS. 2 and 3 are graphs showing the profile of transmission loss of optical fibers in a composite overhead stranded cable upon irradiation with gamma-rays or hot neutrons.
Figure 3:
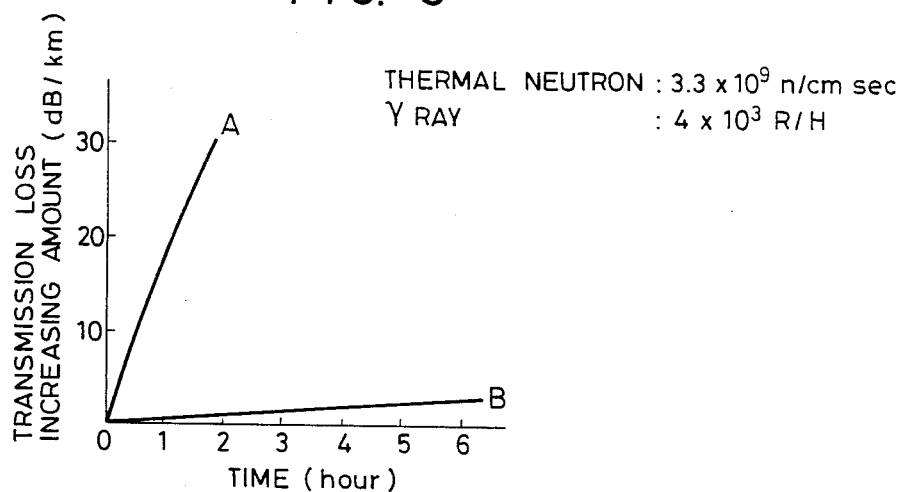

This effect is illustrated in FIGS. 2 and 3 for multi-mode fibers (core diameter 50 microns and cladding diameter 125 microns) containing germanium (A) or fluorine (B) as a solid dopant. FIG. 2 shows the increase in transmission loss at a wavelength of 0.85 microns upon irradiation with gamma-rays, and FIG. 3 shows the result when the fibers were exposed to both gamma-rays and hot neutrons. As can readily be seen, the optical fibers doped with fluorine had a smaller increase in transmission loss upon irradiation with gamma-rays or hot neutrons.

An optical fiber doped with both germanium and fluorine has a greater resistance to radioactive rays than an optical fiber doped with germanium alone since the decrease in the refractive index of the cladding due to fluorine doping permits a corresponding decrease in the amount of germanium that must be doped in the core.

Several Examples of the invention will now be discussed.

EXAMPLE 1

Figure 1:
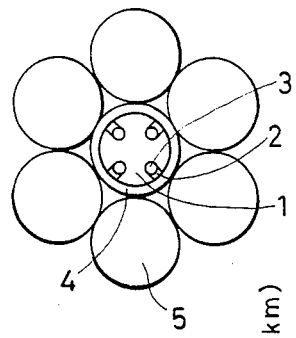
FIG. 1 is a schematic cross section of a composite overhead stranded conductor.
Figure 4:
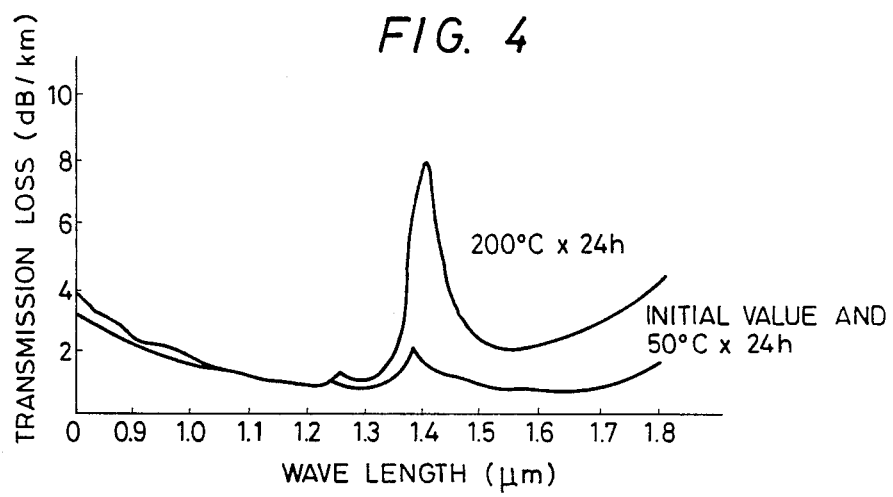
FIGS. 4 and 5 are graphs showing the profile of transmission loss of the optical fibers at elevated temperatures as a function of wavelength.

A composite overhead stranded conductor of the construction shown in FIG. 1 was fabricated. Germanium-doped multi-mode glass fibers having core and cladding diameters of 50 microns and 125 microns and relative index difference of 1% between core and cladding were coated with silicone to an overall diameter of 400 microns and with a nylon jacket to the final overall diameter of 900 microns. Two cable samples were checked for wavelength dependences of transmission losses after heating for 24 hours, one at 50° C. and the other at 200° C. The results are shown in FIG. 4, from which it can be seen that there was an appreciable increase in transmission loss due to absorption by Ge-OH around a peak at 1.41 microns.

Figure 5:
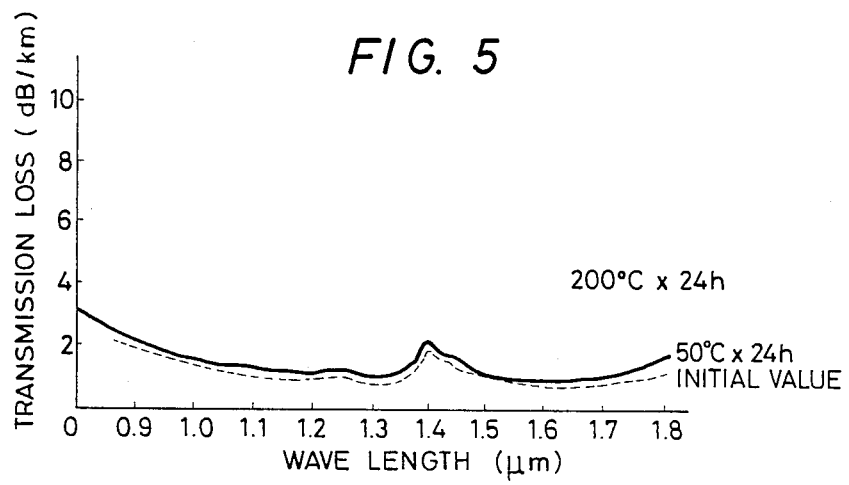

Optical fibers which had the same dimensions as used above except that the core was doped with 0.2% fluorine were subjected to the same heating test, the results of which are shown in FIG. 5. A comparison between FIGS. 4 and 5 shows that the glass fibers doped with fluorine had a greatly reduced loss increase after heating at 200° C. for 24 hours as compared with the fibers not doped with fluorine. The fact that the fluorine-doped fibers had no loss increase due to OH groups in the 1.3 micron band conventionally used in lightwave communications deserves particular note.

EXAMPLE 2

A composite overhead stranded conductor having the construction shown in FIG. 1 was fabricated. Fluorine-doped optical fibers 3 were accommodated in the spiral grooves 2 in an aluminum spacer 1. Each of the optical fibers 3 was coated with an aluminum layer with a thickness of about 25 microns. The spacer 1 was provided with an aluminum jacket 4 to form an optical unit, which was surrounded by strands of aluminum-clad steel wires 5.

The optical fibers incorporated in the composite overhead stranded conductor fabricated in this Example had an aluminum hermetic coat that provided airtightness against the ambient environment. Because no hydrogen could enter the fibers, good transmission characteristics could be maintained. In this Example using a hermetic coat, the protective tube 4 may be omitted and the optical fibers may have a tape wrapped around them. If desired, no jacket at all need be formed around the spacer.

Fluorine resins, polyimide resins and other resin materials that are conventionally used as heatresistant coats on optical fibers decompose at temperatures as low as 300° to 400° C. However, according to the present invention, because the hermetic coat on the optical fibers is made of a metal or metal oxide having a high melting point, better heat-resisting properties are attained than with the conventional resins. For example, aluminum has a melting point of about 550° C. and withstands service at higher temperatures than are practical with the conventional resin coats.

Another feature of the composite overhead stranded conductor of this Example is that it permits the use of optical fibers which are as thin as 200 microns in diameter, and this diameter is much smaller than that of the conventional optical fiber which is typically 700 to 900 microns thick. An advantage resulting from this feature is that more fibers can be accommodated in a composite overhead cable having the same construction as the conventional product.

EXAMPLE 3

Figure 6:
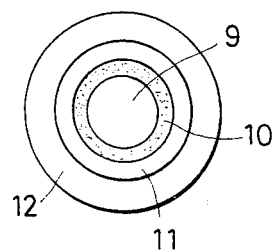
FIG. 6 shows schematically an optical fiber used in a composite overhead stranded conductor.

Optical fibers having the construction shown in FIG. 6 were prepared. Each fiber consisted of a fluorine-doped glass fiber 9 having an outside diameter of 125 microns which was provided with a hermetic coat 10 made of a nonmetallic inorganic material (e.g., silicon nitride) and had an overall diameter of 150 microns. Around the hermetic coat were provided a silicone resin coat 11 and a fluorine resin coat 12. The overall diameters attained by the respective resin coats were 400 microns and 900 microns. The thus-prepared fibers were installed in the spiral grooves in the spacer shown in FIG. 1. The resulting composite overhead stranded conductor having silicone resin inserted between the bottom of each groove and each optical fiber exhibited transmission characteristics as good as those depicted in FIG. 5.

Because the optical fibers used in the composite overhead stranded conductor of this Example had no metallic component, the stranded conductor was optimized with respect to immunity from electromagnetic interference. Hydrogen may be released from the silicone resin or silicone rubber inserted as the heat-resistant elastic material between the optical fiber and the bottom of each groove in the spacer. However, the hermetic coat on the optical fibers provides a barrier against the entrance of hydrogen into the fibers, thereby preventing the formation of OH groups and ensuring good transmission characteristics.

As described in the foregoing, according to the present invention, even if hydrogen is released from the jackets around the optical fibers under elevated temperatures, the fluorine in the optical fibers suppresses the formation of OH groups and effectively prevents any increase in transmission loss. The optical fibers retain high mechanical strength since they are accommodated in the spacer. The hermetic coat on each optical fiber provides a more effective barrier against the entrance of hydrogen from the external environment, and the resulting prevention of the formation of OH groups ensures even better transmission characteristics. If a heat-resistive elastic material such as silicone resin or silicone rubber is filled between each optical fiber and the bottom of the groove and/or between each optical bundle and the bottom of the groove in which it is installed, the optical fibers become integral with the spacer, the local strain due to expansion or contraction of the spacer is prevented, and at the same time, the strain due to twisting in the radial direction is relieved. These effects combine to prevent the occurrence of localized microbending, thereby providing much better transmission characteristics.

We claim:

1. A composite overhead transmission cable comprising a plurality of stranded conductors (5) wound around an optical fiber protective tube (4) of a metallic material which has a plurality of optical fibers (3) and/or optical fiber bundles accommodated therein, characterized by: said optical fibers and/or optical fiber bundles being composed of glass, a spacer (1) having spiral grooves (2) formed in its periphery sealingly accommodated in said protective tube, said optical fibers and/or optical bundles composed of a plurality of said optical fibers being accommodated in said spiral grooves and thus sealed within said tube, and means for suppressing the formation of OH groups that form as a result of hydrogen gas diffusing from the tube and reacting with defects in the optical fibers, said suppressing means including fluorine doping provided exclusively in a cladding of said optical fibers.

2. The cable according to claim 1, wherein each of said optical fibers is provided with a surrounding hermetic coat.

3. The cable according to claim 2, wherein said hermetic coat is formed of a material selected from the group consisting of metals and oxides of metals having a high melting point.

4. The cable according to claim 2, wherein said hermetic coat is made of silicon nitride.

5. The cable according to claim 1, wherein a heat-resistant elastic material is filled between each optical fiber and the bottom of each groove and/or between each optical bundle and the bottom of each groove so that said optical fibers in said grooves are restrained in a longitudinal direction thereof.

6. The cable according to claim 5, wherein said elastic material comprises a material selected from the group consisting of silicone resin and silicone rubber.

7. The cable according to claim 1, wherein each of said optical fibers is coated with aluminum.

8. The cable according to claim 1, wherein each of said optical fibers has a coat of aluminum with a thickness of approximately 25 microns.

* * * * *